(12) United States Patent
Chen et al.

(10) Patent No.: US 10,521,919 B2
(45) Date of Patent: Dec. 31, 2019

(54) INFORMATION PROCESSING DEVICE AND INFORMATION PROCESSING METHOD FOR APPLYING AN OPTIMIZATION MODEL

(71) Applicant: Sony Corporation, Tokyo (JP)

(72) Inventors: Chongyu Chen, Beijing (CN); Lei Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 15/681,686

(22) Filed: Aug. 21, 2017

(65) Prior Publication Data

US 2018/0108141 A1     Apr. 19, 2018

(30) Foreign Application Priority Data

Oct. 17, 2016 (CN) .......................... 2016 1 0901553

(51) Int. Cl.
*G06T 7/50* (2017.01)
*G06K 9/00* (2006.01)
*G06T 7/521* (2017.01)
*G06T 7/593* (2017.01)

(52) U.S. Cl.
CPC ............ *G06T 7/50* (2017.01); *G06K 9/00201* (2013.01); *G06K 9/00302* (2013.01); *G06K 9/00335* (2013.01); *G06T 7/521* (2017.01); *G06T 7/593* (2017.01); *G06T 2200/08* (2013.01); *G06T 2207/10012* (2013.01); *G06T 2207/10024* (2013.01); *G06T 2207/10028* (2013.01); *G06T 2207/20076* (2013.01); *G06T 2207/20221* (2013.01); *G06T 2207/30201* (2013.01)

(58) Field of Classification Search
CPC ..................................................... G06T 7/50
See application file for complete search history.

(56) References Cited

U.S. PATENT DOCUMENTS

| | | | | |
|---|---|---|---|---|
| 7,590,262 | B2 * | 9/2009 | Fujimura | G06K 9/00369 |
| | | | | 382/103 |
| 8,264,536 | B2 * | 9/2012 | McEldowney | G06T 7/521 |
| | | | | 348/135 |
| 9,454,225 | B2 * | 9/2016 | Bychkov | G06F 3/013 |
| 2013/0142452 | A1 * | 6/2013 | Shionozaki | G06T 15/503 |
| | | | | 382/284 |
| 2013/0301907 | A1 * | 11/2013 | Shim | G01B 11/02 |
| | | | | 382/154 |

(Continued)

OTHER PUBLICATIONS

Chen, Chongyu, "Kinect Depth Recovery Using a Color-Guided, Region-Adaptive, and Depth-Selective Framework", May 2015, ACM, vol. 6, pp. 1-19 (Year: 2015).*

(Continued)

*Primary Examiner* — Barry Drennan
*Assistant Examiner* — Terrell M Robinson
(74) *Attorney, Agent, or Firm* — Xsensus LLP

(57) ABSTRACT

The disclosure relates to an information process device and an information processing method. The information processing device according to an embodiment includes a processing circuitry configured to acquire a depth image and information on an imaging characteristic of an image acquisition apparatus captured the depth image; determine, based on the information, an optimization model for processing the depth image; and process the depth image based on the optimization model.

21 Claims, 7 Drawing Sheets

(56) References Cited

U.S. PATENT DOCUMENTS

| | | | | |
|---|---|---|---|---|
| 2015/0145966 A1* | 5/2015 | Krieger | ............... | G06T 17/20 |
| | | | | 348/47 |
| 2016/0034040 A1* | 2/2016 | Wada | ............... | G06F 3/017 |
| | | | | 348/47 |
| 2016/0171765 A1* | 6/2016 | Mehr | ............... | G06F 17/11 |
| | | | | 345/419 |
| 2016/0373717 A1* | 12/2016 | Wang | ............... | H04N 13/111 |

OTHER PUBLICATIONS

Bouaziz, Sofien, "Dynamic 2D/3D Registration for the Kinect", ACM SIGGRAPH 2013 Courses, 2013, ACM, pp. 1-14 (Year: 2013).*

Min, Dongbo, "Depth Video Enhancement Based on Weighted Mode Filtering", 2012, IEEE Transactions on Image Processing, vol. 21, pp. 1176-1190, [retrieved on Aug. 15, 2019], Retrieved from the Internet: <URL:https://ieeexplore.ieee.org/document/5963715> (Year: 2012).*

Smisek, Jan, "3D Kinect" Jan. 2013, Springer London, pp. 3-25, [retrieved on Aug. 15, 2019], Retrieved from the Internet: <URL: https://www.researchgate.net/publication/305108995_3D_with_Kinect> (Year: 2013).*

* cited by examiner

INFORMATION PROCESSING DEVICE AND INFORMATION PROCESSING METHOD FOR APPLYING AN OPTIMIZATION MODEL

FIELD

The disclosure generally relates to information processing, and particularly to an information processing device and an information processing method for depth image enhancement.

BACKGROUND

Depth image plays an important role in various applications such as robotics, human-machine interaction, augmented reality and the like. Particularly, consumer-grade depth sensors make various depth-based applications possible. These applications include, for example, controller-free video games, simple 3D-reconstructions and the like.

Since the quality of depth image influences the performance of a depth-based application, researchers have developed and extended various image filters for depth image restoration and enhancement. These methods may be generally classified into methods based on filtering and methods based on optimization. Generally, the methods based on filtering are faster but have limited enhancement performance, while the methods based on optimization are slower but have good enhancement capabilities.

SUMMARY

In the following, a brief overview of the embodiments of the present invention is given to provide basic understanding to some aspects of the present invention. It should be understood that this overview is not an exhaustive overview of the present invention. It is not intended to determine a critical or important part of the present invention, nor to limit the scope of the present invention. The object of the overview is merely to give some concepts in a simplified manner, which serves as a preamble of a more detailed description described later.

According to an embodiment, an information processing device including a processing circuitry is provided. The processing circuitry is configured to acquire a depth image and information on an imaging characteristic of an image acquisition apparatus captured the depth image; determine, based on the information, an optimization model for processing the depth image; and process the depth image based on the optimization model.

According to another embodiment, an information processing method is provided. The method includes a step of acquiring a depth image and information on an imaging characteristic of an image acquisition apparatus captured the depth image. The method further includes a step of determining, based on the information, an optimization model for processing the depth image. The method further includes a step of processing the depth image based on the optimization model.

According to the embodiments of the present disclosure, the quality of the depth image can be enhanced by optimizing the depth image with the imaging characteristic of the image acquisition apparatus captured the depth image taken into consideration.

BRIEF DESCRIPTION OF THE DRAWINGS

The present disclosure can be better understood by referring to the following description in conjunction with the accompanying drawings. Same or similar reference characters indicate same or similar parts throughout the accompanying drawings. The accompanying drawings are included in the description together with the following specifications as a part of the description for further illustrating preferred embodiments with examples and explaining the principle and advantages of the present disclosure. In the accompanying drawings.

DETAILED DESCRIPTION OF THE EMBODIMENTS

Embodiments of the present disclosure will be described below with reference to the companying drawings. Elements and features described in a companying drawing or an embodiment may be combined with elements and features illustrated in one or more other companying drawings or embodiments in the present disclosure. It should be noted that presentation and explanation of irrelevant components and processes known by those skilled in the art are omitted in the companying drawings and the description for clarity.

Figure 1:
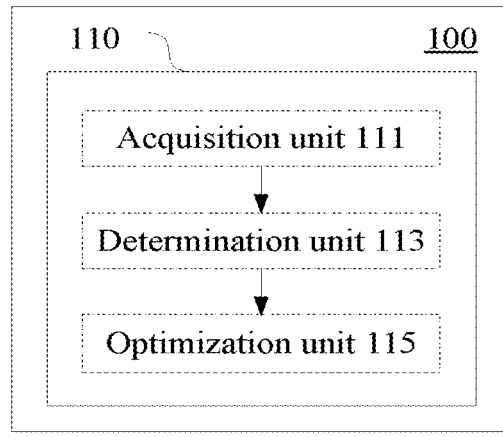
FIG. 1 is a block diagram illustrating a configuration example of an information processing device according to an embodiment of the present disclosure.

FIG. 1 illustrates a configuration example of an information processing device 100 according to an embodiment of the present disclosure. The information processing device may be implemented as a personal computer (for example, a desktop computer, a laptop computer and the like), a work station, a gaming machine (for example, a somatosensory gaming machine), a television set, a mobile terminal (for example, a smart phone, a tablet computer, a portable game terminal and the like), or a camera device (for example, a camera, a monitor and the like). However, the application scope of the embodiments of the present disclosure is not limited to above exemplified aspects, and can be applied to any device capable of acquiring a depth image, or a device in communicational or electrical coupling with a device capable of acquiring a depth image for processing the depth image.

As shown in FIG. 1, the information processing device 100 according to this embodiment include a processing circuitry 110. The processing circuitry 100 may be implemented as, for example, a specific chip, chip set, central processing unit (CPU) or the like.

The processing circuitry 110 includes an acquisition unit 111, a determination unit 113 and an optimization unit 115. It is to be noted that, although the acquisition unit 111, the determination unit 113 and the optimization unit 115 are illustrated in form of functional blocks in FIG. 1, it should be understood that functions of the acquisition unit 111, the determination unit 113 and the optimization unit 115 can be implemented by the processing circuitry 110 as an integral unit, and are not necessarily implemented with discrete actual components in the processing circuitry 110. In addition, although the processing circuitry 110 is shown as one block in FIG. 1, the information processing device 100 may include multiple processing circuitries, and functions of the acquisition unit 111, the determination unit 113 and the optimization unit 115 can be distributed to the multiple processing circuitries, such that the multiple processing circuitries cooperate to execute these functions.

The acquisition unit 111 is configured to acquire a depth image and information on an imaging characteristic of an image acquisition apparatus captured the depth image.

It is to be noted that, the depth image and the information on the imaging characteristic are not necessarily acquired directly by the information processing device, but can be acquired from another device.

The depth image can be acquired from an image acquisition apparatus such as a depth sensor independent of the information processing device 100. The depth sensor may include any existing device capable of generating a depth image (and corresponding intensity image), for example, the Kinect sensor from Microsoft Corporation, the RealSense sensor from Intel Corporation and other hybrid depth acquisition systems.

The information on the imaging characteristic may be, for example, predetermined using a tool such as a calibration board or a ruler based on a calibration algorithm, or may be acquired form a manufacturer of the image acquisition apparatus. The imaging characteristic may be measured separately for each depth sensor, and the measured imaging characteristic may be stored at the information processing device, for example, as a profile. When being connected to the depth sensor, the information processing device may identify the depth sensor connected thereto and acquire the information on an imaging characteristic corresponding to the connected depth sensor from the pre-stored information on the imaging characteristic.

The imaging characteristic of the depth image generally relates to a distance or a space. According to an embodiment, the information on the imaging characteristic of the image acquisition apparatus captured the depth image may include information related to a quantization step of the image acquisition apparatus and/or information related to a noise level of the image acquisition apparatus.

In addition, the information on the imaging characteristic of the image acquisition apparatus captured the depth image may also include information related to a noise type of the image acquisition apparatus. The noise type may include, for example, Gaussian noise, Poisson noise, white noise, and the like. The information related to the noise type may be acquired by, for example, calibration, measurement or calculation for the depth sensor.

Next, an exemplary manner of acquiring the imaging characteristic of the depth image is illustrated by taking the quantization step and the noise level as examples, respectively.

In a case that the image acquisition apparatus includes two camera units, according to an embodiment, the information related to the quantization step includes a baseline distance between the camera units, a focal length of the camera units and the bit number of disparity of the camera units.

Figure 9:
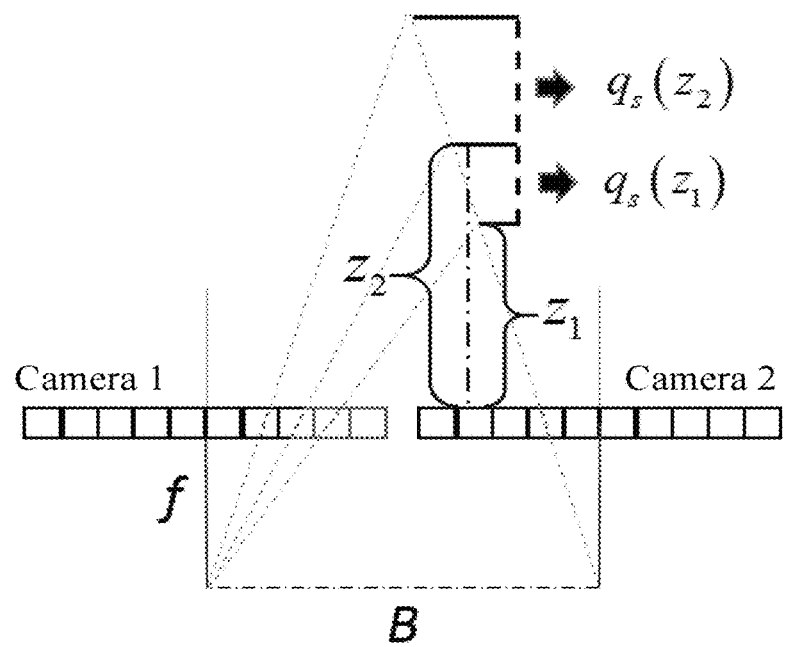
FIG. 9 is a schematic diagram for illustrating a relationship between a quantization step and parameters of an camera.

In a case that depths are measured by triangulation, the quantization step $q_s(z)$ is determined based on the baseline distance B between the camera units and the focal length f FIG. 9 illustrates a relationship between the quantization step and the parameters, which can be expressed as:

$$q_s(z_1) = z_2 - z_1 \approx \frac{c(z_1 + f)^2}{Bf}, \quad \text{Equation 1a}$$

The quantization step corresponds to a distance difference that can be distinguished by neighboring pixels. As shown in FIG. 9 and Equation 1a, the distance difference $z_2-z_1$ is related to the distance between the camera units and the subject. c in Equation 1a represents the bit number of disparity. For example, for a disparity of 8 bits, c=1/256, and for a disparity of 12 bits, c=1/4096. Equation 1a is applicable to any depth sensor using two cameras (for example, stereoscopic color cameras) or a depth sensor using one projector and one camera (for example, the Kinect sensor). An approximation error of such an estimation is no greater than one quantization step. In addition, it can be assumed that the two camera units have a same focal length.

Therefore, according to an embodiment, in a case that a structured light depth sensor is adopted, the quantization step can be approximately determined according to the following Equation 1b:

$$q_s(z) = \frac{c(z + f)^2}{Bf}, \quad \text{Equation 1b}$$

where z represents a depth, i.e., a distance between the image acquisition apparatus and the subject being captured, $q_s(z)$ represents the quantization step, c represents the bit number of disparity, f represents the focal length, and B represents the baseline distance.

For example, the baseline distance B and the focal length f can be estimated using a camera calibration tool. For a specific pixel, the quantization step can be adaptively calculated based on a depth value of the pixel.

In the above example for measuring the quantization step, a method for the structured light depth sensor is provided. It is to be noted that, this method is also applicable to a binocular camera. In addition, other types of depth sensors, for example, a Time of Flight (ToF) sensor also has a quantization step, which may be determined in a corresponding manner.

In another aspect, the noise level of the depth value measured by the depth sensor is also related to the distance. Besides the distance, the noise level may also be spatially variant. For example, different image areas may have different noise levels. Accordingly, the noise levels can be measured at different distances and different positions.

In order to acquire noise levels at respective distances and positions, according to an embodiment, the information related to the noise level acquired by the acquisition unit 111 may include a reference noise level at a reference depth or a reference position, and the acquisition unit 111 may be configured to estimate a noise level at a target depth or a target position by interpolation based on the reference noise level.

For example, an effective operation distance range (for example, which is between 50 mm and 5000 mm for a Kinect sensor) may be divided into multiple (for example, 50 to 100) reference distances, and noise levels respectively corresponding to the reference distances are measured. Then, the noise levels measured for these reference distances may be stored in the information processing device in a form of a matrix, for example. When the noise levels are measured, multiple (for example, dozens of) captured depth images can be aggregated to function as a real depth image for estimation, and are compared with the real depth image to acquire noise levels.

Figure 10:
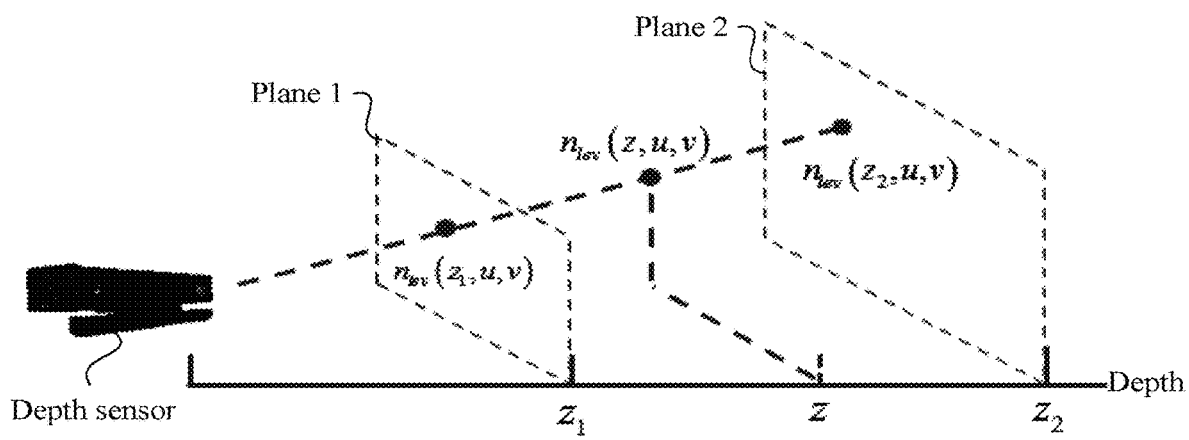
FIG. 10 is a schematic diagram for illustrating noise level measurement and interpolation.
Figure 11A:
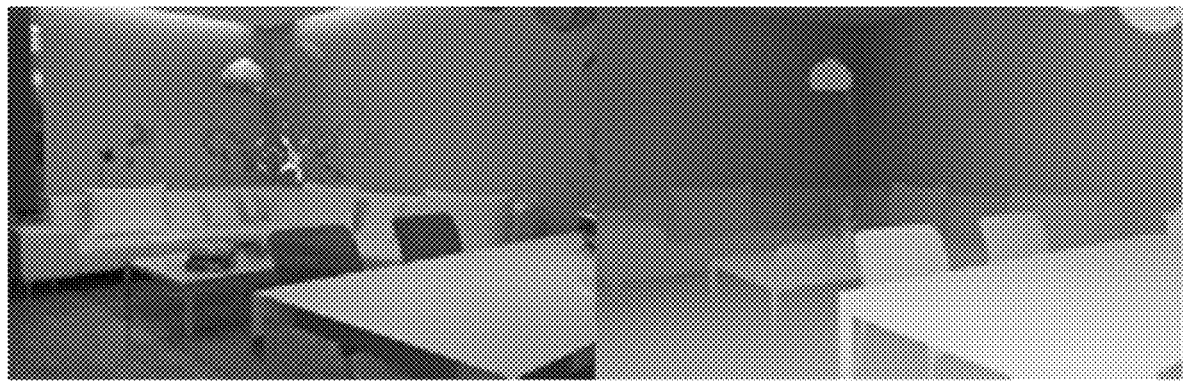
FIGS. 11*a* to 11*d* illustrate exemplary views for quantitatively evaluating the optimization processing according to an embodiment of the present disclosure.
Figure 11B:
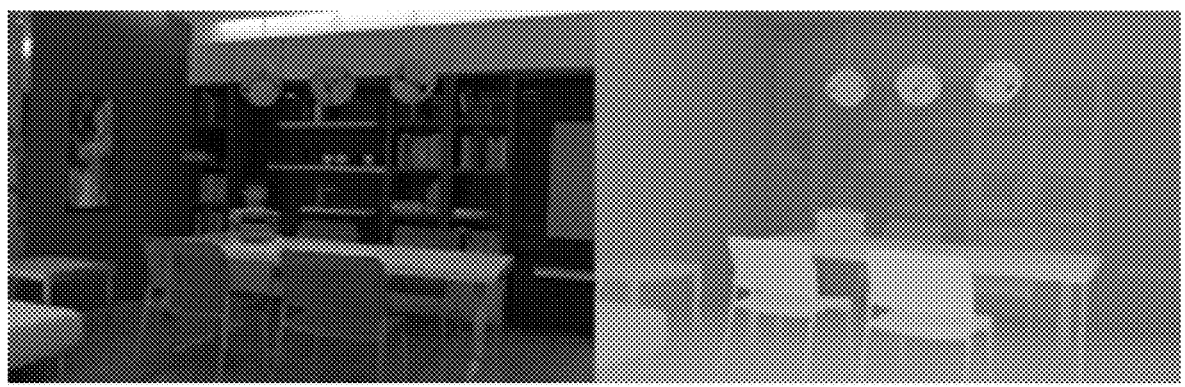
Figure 11C:
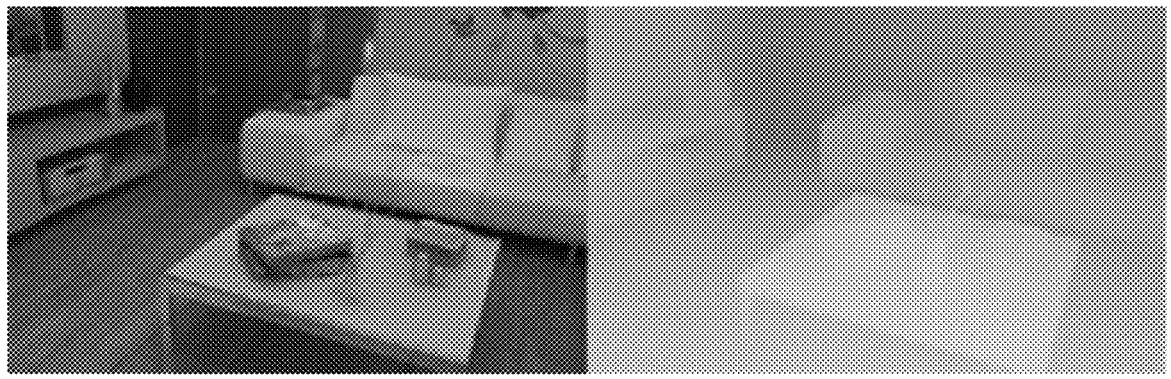
Figure 11D:
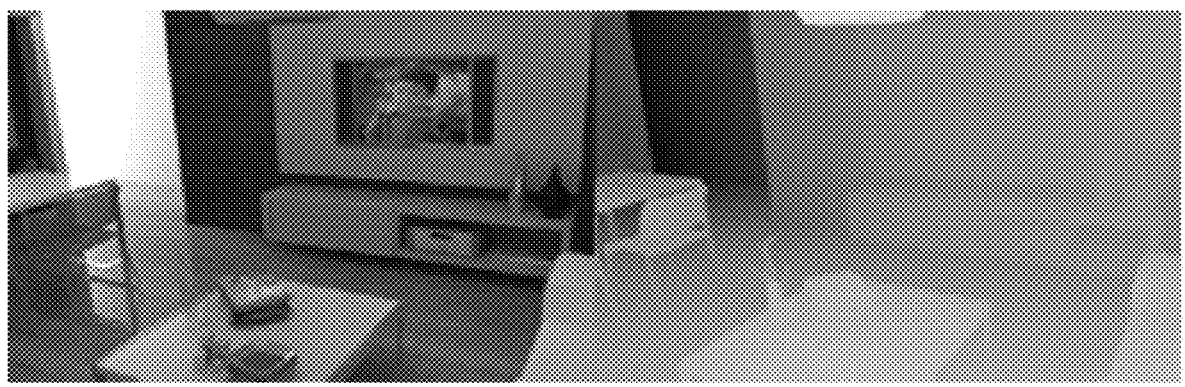

As shown in FIG. 10, after the noise levels at the reference positions are acquired, for a pixel at any position between two reference distances, an estimated noise level may be calculated by, for example, liner interpolation, as expressed by the following Equation 2:

$$n_{lev}(z, u, v) = \frac{(z - z_1)n_{lev}(z_1, u, v) + (z_2 - z)n_{lev}(z_2, u, v)}{z_2 - z_1} \quad \text{Equation 2}$$

where $n_{lev}(z,u,v)$ represents the noise level of a pixel having coordinates $(u,v)$, and a depth $z$ in the depth image, and $n_{lev}(z_1,u,v)$ and $n_{lev}(z_2,u,v)$ are noise levels corresponding to the coordinates $(u,v)$ at the reference depth $z_1$ and the reference depth $z_2$, respectively.

In the above, exemplary manners of acquiring the imaging characteristic of the depth image is illustrated by taking the quantization step and the noise level as examples respectively. However, the present disclosure is not limited thereto. Information related to various other imaging characteristics can be acquired according to the specific type and configuration of the depth image acquisition apparatus.

Reference is still made to FIG. 1. The determination unit 113 is configured to determine an optimization model for processing the depth image based on the information on the imaging characteristic of the image acquisition apparatus acquired by the acquisition unit 111.

According to an embodiment, the optimization module includes a quadratic term in a form of a weighted sum of quadratic functions of the depth value, and the determination unit 113 is configured to determine weights in the weighted sum according to the information acquired by the acquisition unit 111.

According to an exemplary embodiment, the quadratic term may include a fidelity term in a form of the following Equation 3:

$$D_i(U) = \sum_{p \in \Omega_i} \eta_i(p)(U(p) - Z_i(p))^2, \quad \text{Equation 3}$$

where $D_i(U)$ represents the fidelity term, U represents the optimized depth image, i is an index of the fidelity term, p represents a target pixel, $Z_i$ represents a measured depth image, $\Omega_i$ represents a set of available pixels in the measured depth image, and $\eta_i(p) \geq 0$ is a weight for the target pixel.

As described above, the information on the imaging characteristic of the image acquisition apparatus acquired by the acquisition unit 111 may include information related to a quantization step of the image acquisition apparatus. In this case, the determination unit 113 may be configured to determine a weight of the fidelity term based on the information related to the quantization step, such that the greater the quantization step, the smaller the weight $\eta_i(p)$.

In addition, the quadratic term may also include an energy term in the following form:

$$E_i(U) = \sum_{p \in \Omega_i} \sum_{q \in \Omega_q} \frac{1}{2}\lambda_{pq}(U(p) - U(q))^2, \quad \text{Equation 4}$$

where $E_i(U)$ represents the energy term, U represents an optimized depth image, i is an index of the energy term, p represents a target pixel, q represents available pixels around the target pixel, $\Omega_i$ represents a set of available pixels in a measured depth image, $\Omega_q$ represents a set of available pixels around the target pixel, and $\lambda_{pq} \geq 0$ is a weight for a pair of pixels P and q $$\left(\sum_{q \in \Omega_p} \lambda_{pq} = 1\right).$$

As described above, the information on the imaging characteristic of the image acquisition apparatus acquired by the acquisition unit 111 may include information related to the noise level of the image acquisition apparatus. In this case, the determination unit 113 may be configured to determine the optimization model such that the greater the similarity between the pair of pixels p and q, the greater the weight $\lambda_{pq}$, and the greater the noise level, the more effective terms being involved in the weighted sum of the energy term. Generally, in the energy term, the greater the depth value, the greater the noise level, and thus the more effective terms being involved in the weight sum. The effective term involved in the weighted sum refers a term of which a weight is greater than a predetermined threshold (for example, 0.001) in the weighted sum.

According to an embodiment, depth enhancement may be converted into a convex optimization problem expressed by the following expression:

$$\min_U \sum_{i=1}^{k} \alpha_i D_i(U) + \sum_{i=1}^{l} \beta_i E_i(U) \quad \text{Expression 5a}$$

where $k \geq 1$ and $l \geq 0$ are the numbers of the fidelity terms and the energy terms, respectively.

In a case that the optimization model only includes the fidelity terms and the energy terms, the whole optimization model may be converted into filters, for example, thereby increasing the processing speed.

Further, according to an example, the optimization model may also include a regularization term other than the above quadratic term, and can be solved separately for the regularization term and the quadratic term, and then the solving results are fused and iteratively updated.

In the above exemplary embodiment, the depth enhancement is converted into a convex optimization problem expressed by the following Expression:

$$\min_U \sum_{i=1}^{k} \alpha_i D_i(U) + \sum_{i=1}^{l} \beta_i E_i(U) + \sum_{i=1}^{m} \gamma_i R_i(U) \qquad \text{Expression 5b}$$

where $k \geq 1$, $l \geq 0$ and $m \geq 0$ are the numbers of the fidelity terms, the energy terms, and the regularization terms, respectively.

In a case that the optimization model includes the fidelity term(s), the energy term(s) and the regularization term(s), in an aspect, the processing speed can be increased by converting the fidelity term(s) and the energy term(s) into filters; and in another aspect, the effect of the optimization on the image can be enhanced by the regularization term.

Further, according to an embodiment, the optimization model may include the fidelity term(s) and the regularization term(s). Accordingly, the depth enhancement is converted into a convex optimization problem expressed by the following Expression:

$$\min_U \sum_{i=1}^{k} \alpha_i D_i(U) + \sum_{i=1}^{m} \gamma_i R_i(U) \qquad \text{Expression 5c}$$

where $k \geq 1$ and $m \geq 0$ are the numbers of the fidelity terms and the regularization terms, respectively.

In a case that the optimization model includes the fidelity term and the regularization term, the effect of the optimization on the image can be enhanced by the regularization term.

In addition, additional descriptions for primary symbols in the above equations are listed in the following:

k corresponds to the number of depth sensors, where k=1 corresponding to a single-sensor system, and k>1 corresponding to a multi-input system;

$Z_i$ represents a depth image captured by an i-th depth sensor;

$E_i(U)$ represents a quadratic function defined according to an i-th local filter;

$\lambda_{pq}$ represents a similarity between pixels in a form of a normalized weight, and may be described using color, depth or another local descriptor; and $R_i(U)$ represents a non-quadratic regularization term related to the depth image U, for example, a space domain total variance $\|U\|_{TV}$ and transform domain sparseness $\|TU\|_1$.

The requirement on the regularization term is that the regularization term is convex for the depth image U. The optimization model may include any regularization term facilitating improving the quality of the depth image.

In addition, the following constraints can be applied to the weighs in the above weighted sum.

Constraint 1:

$$\sum_{i=1}^{k} \alpha_i \geq \sum_{i=1}^{l} \beta_i,$$

which makes the sub-problem $$\min_U \sum_{i=1}^{k} \alpha_i D_i(U) + \sum_{i=1}^{l} \beta_i E_i(U)$$

be convex, and can be converted into a diagonally dominant linear system.

Constraint 2: $\eta_i(p)$ is required to be small when $Z(p)$ is great. Referring to the above Equations 1a and 1b, the quantization step is greater when the depth z is greater. Therefore, this constraint corresponds to the above requirement that the greater the quantization step, the smaller the weigh $\eta_i(p)$. In other words, a greater quantization step indicates a less reliable depth value, thus the depth value has a smaller weight in the fidelity term.

Constraint 3: $\lambda_{pq}$ shall be greater when $Z(p)$ and $Z(q)$ have a greater similarity.

The above Constraint 2 and Constraint 3 enable the influence of the imaging characteristics to be included in the determined optimization model.

In the following, specific examples of the optimization model are provided.

Example 1

In this example, the optimization model is $$\min_U D(U) + \beta E(U),$$

which includes one fidelity term and one energy term, both of which are quadratic terms.

The fidelity term is defined as:

$$D(U) = \frac{1}{2} \sum_{p \in \Omega} \eta(p)(U(p) - Z_1(p))^2, \qquad \text{Equation 6}$$

where the weight is determined to be $$\eta(p) = \left(\frac{1}{q(p)}\right)^{\frac{1}{2}}$$

according to Equation 1b and the imaging characteristics of the Kinect sensor (having a disparity of 12 bits, a focal length of 5.25 mm, and a baseline distance of 75 mm) as an example, where $$q(p) = \frac{(Z_1(p) + 5.25)^2}{4096 \times 75 \times 5.25}$$

is the quantization step.

In addition, according to Equation 4, the energy term E(U) can be defined using a weight in the following form:

$$\lambda_{pq} = \exp\left(\frac{-\|p-q\|^2}{0.5w^2}\right) \exp\left(\frac{-(Z_1(p) - Z_1(q))^2}{2\sigma^2}\right) \qquad \text{Equation 7}$$

where $w=9$ is a filter window, $\rho=2\eta(p)$ is an estimated noise level at a point p. Such a definition can be considered as a variation of an adaptive bilateral filter (BF).

Example 2

In this example, the optimization model is $$\min_U D(U) + \beta_1 E_1(U) + \beta_2 E_2(U),$$

where $D(U)$ and $E_1(U)$ have same definitions as $D(U)$ and $E(U)$ in Example 1, respectively. Similarly, according to Equation 4, the energy term $E_2(U)$ can be defined with a similar measurement of similarity using a weight in the following form.

$$\lambda_{pq} = \exp\left(\frac{-\|p-q\|^2}{0.5w^2}\right)\exp\left(\frac{-(I_1(p)-I_1(q))^2}{288}\right) \quad \text{Equation 8}$$

where $I_1$ is a gray level image corresponding to the depth image. This definition can be considered as a variation of an adaptive joint bilateral filter (JBF).

In the above examples, the optimization model includes the fidelity term and the energy term. In addition, as described above, the optimization model may further include the regularization term.

In the following, an example of such an optimization model is provided.

Example 3 the optimization model of the example is $$\min_U D(U) + \beta E(U) + \gamma R(U),$$

which includes one fidelity term, one energy and one regularization term. The fidelity term and the energy term may have exemplary forms described in the above Examples 1 and 2, and the regularization term may have an exemplary form among those provided in the following Table 1. For example, the regularization term may be related to polarization information. In this example, the effect of the enhancement on the depth image can be further increased based on other information such as the polarization information by the additionally including the regularization term into the optimization model.

Various terms in the optimization model in the embodiments of the present disclosure may have different specific forms, and the optimization model may include various combinations of terms. Some exemplary forms of the terms are listed in the following Table 1, in which terms and description for the parameters of respective terms are respectively provided in columns "Parameter and Description" and "Note".

TABLE 1

| Term | Form | Parameter and Description | Note |
|---|---|---|---|
| $D_i(U)$ | $\frac{1}{2}\sum_{p\in\Omega_i}\eta_i(p)(U(p)-Z_i(p))^2$ | $\eta_i(p) = 1$ | A common L2 norm |
| | | $\eta_i(p) \propto 1/Z_1(p)$ | A weighted L2 norm |
| $E_i(U)$ | $\sum_{p\in\Omega_i}\sum_{q\in\Omega_q}\frac{1}{2}\lambda_{pg}(U(p)-U(q))^2$ | $\lambda_{pg} \propto -\frac{\|p-q\|_2^2}{2\sigma_s^2} - \frac{(Z_1(p)-Z_1(q))^2}{2\sigma_z^2}$ | Bilateral filtering |
| | | where $\sigma_s$ is a preset parameter which is related to a size of search window, and $\sigma_z$ is the noise level. | |
| | | $\lambda_{pg} \propto -\frac{\|p-q\|_2^2}{2\sigma_s^2} - \frac{\|I(p)-I(q)\|_2^2}{2\sigma_z^2}$ | Joint bilateral filtering |
| | | $\lambda_{pg} \propto -\frac{\|p-q\|_2^2}{2\sigma_s^2} - \frac{\|I(p)-I(q)\|_2^2}{2\sigma_z^2} - \frac{(Z_1(p)-Z_1(q))^2}{2\sigma_z^2}$ | Joint trilateral filtering |
| | | $\lambda_{pg} \propto -\frac{\|I(p)-I(q)\|_2^2}{2\sigma_z^2}$ | Non-local average filtering |
| $R_i(U)$ | $\|U\|_{TV}$ | N.A. | Smoothness of space domain |
| | $\frac{1}{2}\|T(U)\|_1$ | T represents non-expensive transform | Sparsity of transform domain |
| | $\frac{1}{2}\|\nabla_S^2 U - \nabla_S^T N^{corr}\|_2^2$ | S represents a set of spanning trees including the image, $\nabla_S^2$ represents a Laplacian operator calculated on S, | Combined with polarization |

TABLE 1-continued

| Term | Form | Parameter and Description | Note |
|------|------|---------------------------|------|
| | | $\nabla_S^T$ represents a divergence operator calculated on S, $N^{corr} = \tilde{A}(N^{polar})$, where $\tilde{A} = \min_A \|N^{Z_1} - A(N^{polar})\|_2^2 + \gamma \|A\|_{TV}$ s.t. $A \in \{0, 1\}$ $N^{Z_1}$ is a normal map estimated based on the inputted depth image $Z_1$, and $N^{polar}$ is a normal map estimated based on polarization. | |

The forms listed above are only exemplary forms of the optimization model. Forms of respective terms and combinations thereof can be determined according to application requirements.

In addition, the term related to polarization is included in the above examples. Correspondingly, according to an embodiment, the acquisition unit 111 may be further configured to acquire polarization information corresponding to the depth image.

For example, the acquisition unit 111 may acquire the depth image and the polarization information from a depth sensor capable of acquiring the polarization information. Such a sensor includes, for example, a RGB+D+P type sensor, where RGB represents intensity image, D represents depth image, and P represents polarization information.

The depth image can be enhanced using shape information acquired based on the polarization information. For example, surface normal (also referred to as polarization normal) acquired based on the polarization information can be used in combination with the depth image for depth enhancement, where a coarse depth image provides a geometry structure of a subject, and fine details can be acquired with the surface normal for fusion. The quality of 3D reconstruction can be increased by using the polarization information.

Reference is still made to FIG. 1. The optimization unit 115 is configured to process the depth image based on the optimization model determined by the determination unit 113.

According to an embodiment, the process made by the optimization unit 115 on the depth image based on the optimization model may include: converting the quadratic term(s) into a linear system; deriving a filter by solving the linear system; and applying the filter to the depth image. For example, the liner system may be solved by using a Jacobi iterative method to derive the filter.

A method for deriving the filter from the optimization model is described below in conjunction with a specific example.

As described above, in a case that the optimization model includes a regularization term other than the above quadratic term(s), the liner system can be solved respectively for the regularization term and the quadratic term(s). The quadratic term(s) in the optimization model can be considered as an optimization sub-problem expressed as follow:

$$\min_U \sum_{i=1}^{k} \alpha_i D_i(U) + \sum_{i=1}^{l} \beta_i E_i(U) \qquad \text{Expression 9}$$

The quadratic term(s) is converted into a diagonally dominant linear system. Solving the liner system using the Jacobi iterative method may be considered as applying weighted averaging to each pixel, where the weight is derived according to Equation 9. For example, given that k=1 l=1, and $\alpha_1$=1, Equation 9 can be simplified to be $\min_U D_1(U)+\beta_1 E_1(U)$, and a p-th equation of the related liner system can be written as:

$$\left(\eta_1(p) + \beta_1 + \beta_1 \sum_{q \in \Omega_p} \lambda_{qp}\right) U(p) - \qquad \text{Equation 10}$$

$$\beta_1 \sum_{q \in \Omega_p} (\lambda_{pq} + \lambda_{qp}) U(q) - \eta_1(p) Z_1(p) = 0$$

Therefore, a Jacobi iteration of U(p) can be written as:

$$U^{(t+1)}(p) = \frac{\eta_1(p) Z_1(p) + \beta_1 \sum_{q \in \Omega_p} (\lambda_{pq} + \lambda_{qp}) U(q)}{\eta_1(p) + \beta_1 + \beta_1 \sum_{q \in \Omega_p} \lambda_{qp}} \qquad \text{Equation 11}$$

where t is the number of iterations.

According to the form of the Jacobi iteration, a filter for the sensor can be defined as:

$$Y(p) = \frac{\eta_1(p) Z_1(p) + \beta_1 \sum_{q \in \Omega_p} (\lambda_{pq} + \lambda_{qp}) X(q)}{\eta_1(p) + \beta_1 + \beta_1 \sum_{q \in \Omega_p} \lambda_{qp}} \qquad \text{Equation 12}$$

where X is the inputted depth image, and Y is the filtered depth image.

In this manner, the filter for the sensor can be derived.

Further, when the objective function of Equation 5 includes more terms, filters can be derived in similar manner. For example, when another similarity measurement (denoted as $\lambda^*_{pq}$) is used, the filter of Equation 12 can become:

Equation 13
$$Y(p) = \frac{\eta_1(p)Z_1(p) + \beta_1 \sum_{q \in \Omega_p}(\lambda_{pq} + \lambda_{qp})X(q) + \beta_2 \sum_{q \in \Omega_p}(\lambda^*_{pq} + \lambda^*_{qp})X(q)}{\eta_1(p) + \beta_1 + \beta_2 + \beta_1 \sum_{q \in \Omega_p}\lambda_{qp} + \beta_2 \sum_{q \in \Omega_p}\lambda^*_{qp}}$$

where $\beta_2$ is a weight for this similarity measurement.

Next, an exemplary manner of solving the optimization model respectively for the regularization term and the quadratic term(s) is described. The regularization term and the quadratic term(s) can be respectively solved using a splitting proximal framework. The procedure may include filtering, applying a proximity operator, and aggregating. The procedure of applying the proximity operator depends on the definition of $R_i(U)$. An efficient definition can be used for fast implementation. For example, in a case of the definition $R_i(U) = \tau \|U\|_{TV}$, there is a need for a fast algorithm to solve the following expression:

$$\operatorname*{argmin}_U \frac{1}{2}\|U - X^{(n)}_{i+1}\|_2^2 + \tau\|U\|_{TV} \qquad \text{Expression 14}$$

The solving procedure may be equivalent to a series of non-expensive operations. Therefore, the fast algorithm becomes a non-expensive operation.

In the following, an exemplary procedure of solving the optimization problem expressed by Equation 5 is described.

---

Input: the number of iterations $n_{max}$, parameters $\alpha_i \geq 0$, $\beta_i \geq 0$, and $\gamma_i \geq 0$;

predetermined weight $w_i \geq 0$, $\sum_{i=1}^{m+1} w_i = 1$.

Initialization: $X_1^{(1)} = X_2^{(1)} = \ldots = X_{m+1}^{(1)} = Z_1$; $U^{(1)} = Z_1$;
for $n = 1, \ldots, n_{max}$ do
    Filtering: filtering for the sensor is performed on $X_1^{(n)}$ to acquire $Y_1^{(n)}$;
    for $i = 1, \ldots, m$ do
        applying the proximity operator:

$$Y_{i+1}^{(n)} = \operatorname*{argmin}_U R_i(U) + \frac{1}{2}\|U - X_{i+1}^{(n)}\|_2^2$$

end

Aggregation: $Y^{(n)} = \sum_{i=1}^{m+1} w_i Y_i^{(n)}$ for $i = 1, \ldots, m + 1$ do
        $X_i^{(n+1)} = X_i^{(n)} + 2Y^{(n)} - U^{(n)} - Y_i^{(n)}$
    end
    $U^{(n+1)} = Y^{(n)}$;
end
Output: $\hat{U} = U^{(n_{max})}$

---

Next, results of processing the exemplary synthetic data sets shown in FIGS. 11a to 11d using the optimization models in the above Example 1 and Example 2 are provided. FIGS. 11a to 11d respectively corresponding to views 1 to 4 in the following Table 2. Images on the left sides of FIGS. 11a to 11d are intensity images, and images on the right side of FIGS. 11a to 11d are corresponding depth images.

Parameters $\beta_1 = \beta = 20$, and $\beta_2 = 40$. The number of iterations of the iterative filtering is 5.

In addition, as described above, Example 1 may be considered as a variation of an adaptive bilateral filter (BF), and Example 2 may be considered as a variation of an adaptive joint bilateral filter (JBF). Therefore, processing results of the optimization models in Example 1 and Example 2 are respectively compared with the processing results (peak signal to noise ratios (PSNRs) and mean square errors (MSEs)) of BF and JBF.

By comparing the results shown in Table 2, it can be seen that the processing results of the optimization models in Example 1 and Example 2 according to the embodiments of the present disclosure are superior to that acquired using respective existing optimization models. Further, since more terms and parameters are involved in the optimization model in Example 2, the performance of this optimization model is further superior to the optimization model in Example 2.

TABLE 2

(where PSNR is in the unit of dB, and MES is in the unit of mm)

| | Method | | | | |
|---|---|---|---|---|---|
| Data | Unprocessed (PSNR/ MSE) | JBF (PSNR/ MSE) | BF (PSNR/ MSE) | Example 1 (PSNR/ MSE) | Example 2 (PSNR/ MSE) |
| View 1 | 10.83/ 5374.02 | 13.08/ 3203.04 | 14.42/ 2352.24 | 19.78/ 628.42 | 20.27/ 611.14 |
| View 2 | 12.69/ 3497.65 | 12.15/ 3965.19 | 15.97/ 1643.47 | 19.54/ 722.97 | 20.04/ 643.97 |
| View 3 | 17.61/ 1127.03 | 19.86/ 671.66 | 21.13/ 501.50 | 25.49/ 183.66 | 25.53/ 181.91 |
| View 4 | 11.24/ 4884.41 | 12.75/ 3448.66 | 14.87/ 2118.97 | 21.43/ 467.85 | 21.77/ 433.05 |
| Average | 13.09/ 3720.78 | 14.46/ 2819.89 | 16.60/ 1654.05 | 21.56/ 500.73 | 21.90/ 325.60 |

In addition, according to some embodiments, the information processing device may include an image acquisition apparatus. The depth image processed by the optimization unit may be, for example, an image acquired by the image acquisition apparatus in real time.

Figure 2:
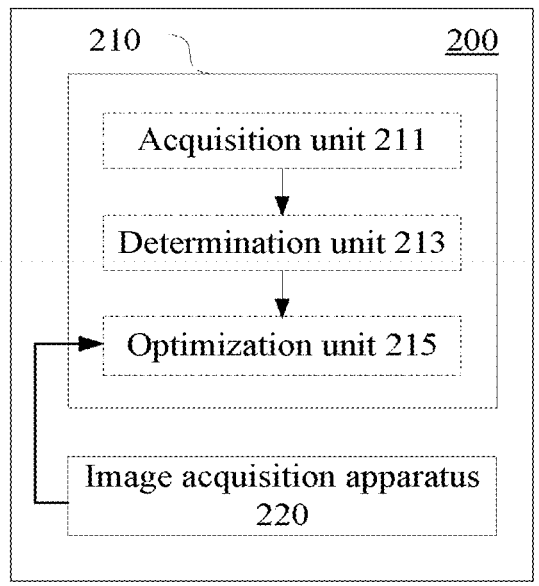
FIG. 2 is a block diagram illustrating a configuration example of an information processing device according to another embodiment of the present disclosure.

FIG. 2 illustrates a configuration example of an information processing device according to an embodiment. As shown in FIG. 2, the information processing device 200 includes a processing circuitry 210. The processing circuitry 210 includes an acquisition unit 211, a determination unit 213 and an optimization unit 215. The information processing device 200 further includes an image acquisition apparatus 220 configured to capture a depth image of a subject to be used as a processing object of the optimization unit 215. The optimization unit 215 acquires an inputted depth image from the image acquisition apparatus 220 (an intensity image, a polarization image and the like may also be acquired as needed). Apart from this, other aspect of configurations of the acquisition unit 211, the determination unit 213 and the optimization unit 215 are the same as corresponding units described above with reference to FIG. 1, thus the repeated description thereof is omitted here.

According to an embodiment, the image acquisition apparatus 220 may further be configured to capture an intensity image and/or a polarization image. The image acquisition apparatus 220 may include, for example, a RGB-D data acquisition apparatus, which includes a depth image capturing apparatus such as a depth sensor, and an intensity image capturing apparatus such as a color camera. The color camera is capable of, for example, capturing successive color image sequences, and may be any commercially available camera. The depth sensor is responsible for capturing successive depth image sequences, and may be a structured light depth acquisition device such the Kinect sensor, or may be a ToF camera. As described above, the image acquisition apparatus 220 may further include a RGB-D-P data acquisition apparatus.

The image acquisition apparatus 220 is capable of providing a depth image and an intensity image which are captured at a same time instant and have a pixel correspondence. The pixel correspondence between the intensity image, the depth image and the polarization image can be determined using a camera calibration technology, and the images being captured at a same time instant can be guaranteed, for example, using a hardware synchronization circuitry. Outputs of the RGB-D data acquisition apparatus are a color image sequence and a depth image sequence synchronized with each other, which are also referred to as a RGB-B sequence or a RGB-D data stream.

Further, according to an embodiment, the subject being imaged may include human, and the information processing device may implement the function of a human-machine interface such as a controller-free human-machine interaction interface by object recognition. In addition, application examples of the human-machine interface may include but not limited to: FaceShift, which analyzes a human face based on depth data, and transfers human facial expression to a virtual character; a somatosensory gaming machine, for example, Xbox 360, which is capable of analyzing and recognizing human actions based on depth data thereby controlling actions of a game character; and an algorithm for recognizing gestures integrated in a smart television for helping the user to control the television. The embodiments related to the human-machine interfaces according to the present disclosure may be used in combination with such exemplary applications for further enhancing effects of the above applications by improving the quality of the depth images.

Figure 3:
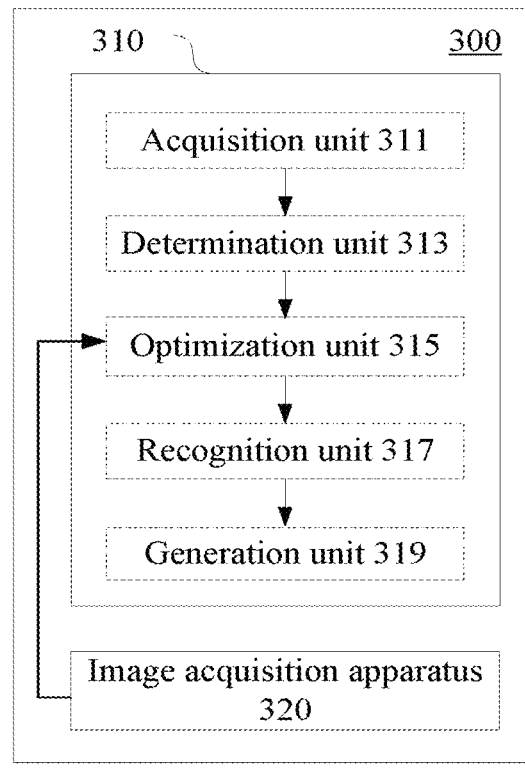
FIG. 3 is a block diagram illustrating a configuration example of an information processing device according to yet another embodiment of the present disclosure.

As shown in FIG. 3, an information processing device 300 according to an embodiment includes a processing circuitry 310 and an image acquisition apparatus 320. The processing circuitry 310 includes an acquisition unit 311, a determination unit 313, an optimization unit 315, a recognition unit 317 and a generation unit 319. Configurations of the acquisition unit 311, the determination unit 313, the optimization unit 315 and the image acquisition apparatus 320 are the same as that of corresponding units and the image acquisition apparatus described in the above embodiments, and repeated description thereof is omitted here.

The recognition unit 317 is configured to recognize, for example, a facial expression, an action, a gesture or the like of a subject based on an intensity image acquired by the image acquisition apparatus 320 and/or a depth image processed by the optimization unit 315.

The recognition processing of the recognition unit 317 may be implemented based on technologies known in the field of pattern recognition such as the deep neural network technology.

The generation unit 319 may be configured to generate a corresponding operation instruction based on a facial expression, an action (for example, an action of a portion or all of a human body) or a gesture recognized by the recognition unit 317.

In addition, besides the human-machine interface function, the depth image processing according to the embodiments of the present disclosure is also applicable to 3D image reconstruction.

Figure 4:
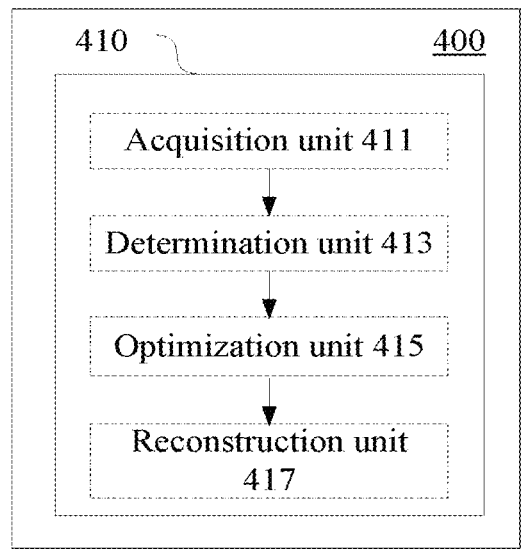
FIG. 4 is a block diagram illustrating a configuration example of an information processing device according to still another embodiment of the present disclosure.

As shown in FIG. 4, an information processing device 400 according to an embodiment includes a processing circuitry 410. The processing circuitry 410 includes an acquisition unit 411, a determination unit 413, an optimization unit 415, and a reconstruction unit 417. Configurations of the acquisition unit 411, the determination unit 413, and the optimization unit 415 are the same as that of corresponding units described in the above embodiments, and repeated description thereof is omitted here.

The reconstruction unit 417 is configured to perform a 3D reconstruction process of an object based on a depth image processed by the optimization unit 415.

For example, the 3D reconstruction process may include depth fusion and/or texture mapping.

Texture mapping refers to mapping texture features of an object to corresponding positions on a 3D model. The texture feature may include subtle variations in color, lighting and a surface structure which make the surface of the 3D model more realistic.

If a given depth image sequence is acquired by capturing an object or a scenario from different angles, a 3D model of the object or the scenario can be acquired using the depth fusion technology. Fusion of depth images requires attitudes of the depth images when being captured. If two successive frames of depth image have a small difference in attitude, capturing attitudes may be acquired from the depth images using an iterative closest point method, and then multiple depth images are fused into a complete 3D model according to attitudes corresponding to the depth images. The depth fusion technology includes, for example, a method based on visibility, a method based on total variance, a method based on probability, a method based on octree, and the like.

The information processing device according to the embodiments of the disclosure and exemplary applications thereof are described above in conjunction with exemplary embodiments. However, the aspects to which the embodiments of the present disclosure are applicable is not limited to the above aspects, but may include various application fields associated with the depth image.

In the description of the information processing device according to the embodiments of the present disclosure, it is obvious that some methods and procedures are also disclosed. Next, the information processing method according to the embodiments of the present disclosure is described without repeating specific details described above.

Figure 5:
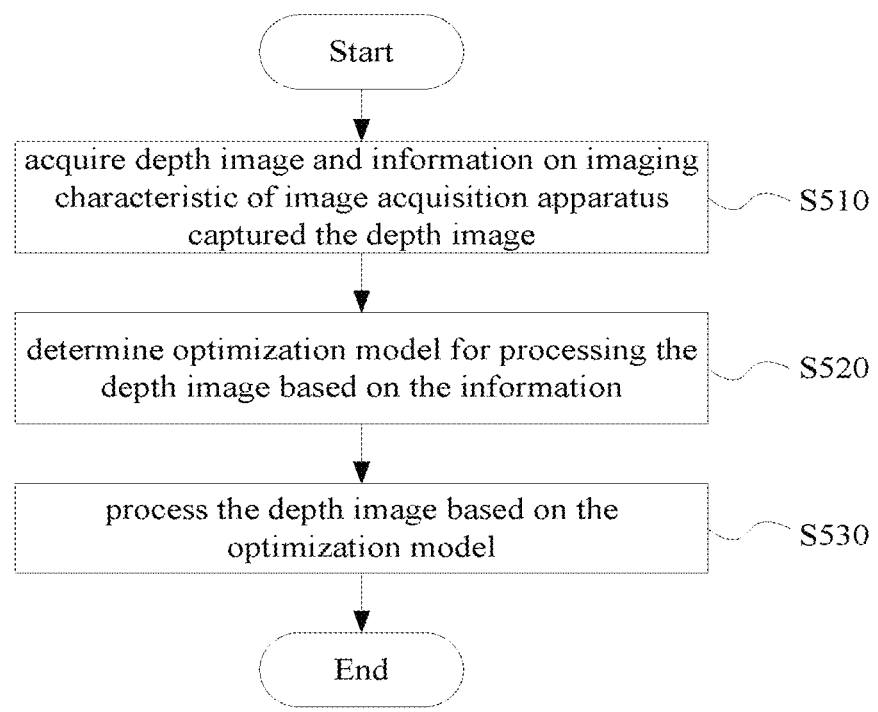
FIG. 5 is a flow chart illustrating a procedure example of an information processing method according to an embodiment of the present disclosure.

As shown in FIG. 5, the information processing method according to the embodiment of the present disclosure includes:

In S510, a depth image and information on an imaging characteristic of an image acquisition apparatus captured the depth image are acquired.

In S520, an optimization model for processing the depth image is determined based on the information.

In S530, the depth image is processed based on the optimization model.

Figure 6:
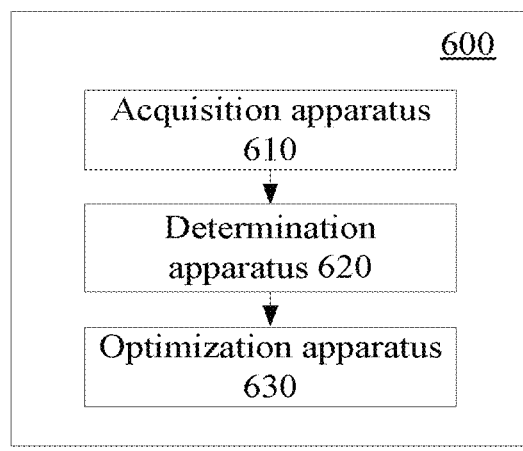
FIG. 6 is a block diagram illustrating a configuration example of an information processing device according to another embodiment of the present disclosure.

FIG. 6 illustrates a configuration example of an information processing device according to an embodiment. As shown in FIG. 6, the information processing device includes an acquisition apparatus 610, a determination apparatus 620 and an optimization apparatus 630. The acquisition apparatus 610 is configured to acquire a depth image and information on an imaging characteristic of an image acquisition apparatus captured the depth image. The determination apparatus 620 is configured to determine an optimization model for processing the depth image based on the acquired information. The optimization apparatus 630 is configured to process the depth image based on the determined optimization model.

Figure 8:
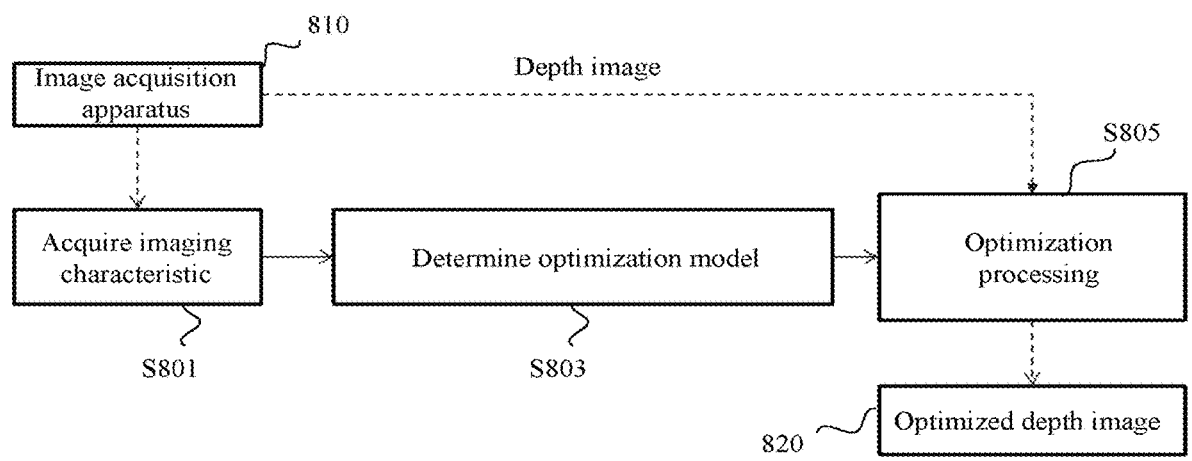
FIG. 8 is a schematic diagram for illustrating an overall configuration according to an embodiment of the present disclosure.

Next, an overall solution of an embodiment of the present disclosure is summarized with reference to the schematic diagram illustrated in FIG. 8. As shown in FIG. 8, in step S801, information on an imaging characteristic of an image acquisition apparatus 810 is acquired; in S802, an optimization model (for example, the filter for the sensor described above) is determined based on the imaging characteristic; and in S805, a depth image acquired by the image acquisition apparatus 810 is processed using the determined model to acquire an optimized depth image 820.

A depth image is optimized with the imaging characteristic of the image acquisition apparatus captured the depth image being taken into consideration, thus the restoration effect of the optimization on the depth image can be enhanced. In addition, in some embodiments, the processing efficiency can be increased while ensuring the effect of the optimization by converting the quadratic term(s) in the model into a filter.

As an example, steps of the above methods and components and/or units of the above devices may be implemented as software, firmware, hardware or a combination thereof. In a case of implementing in software or firmware, a program of a software for implementing the above methods may be installed from a storage medium or a network to a computer (such as the general-purpose computer 700 shown in FIG. 7) having dedicated hardware. The computer can perform various functions if installed with various programs.

Figure 7:
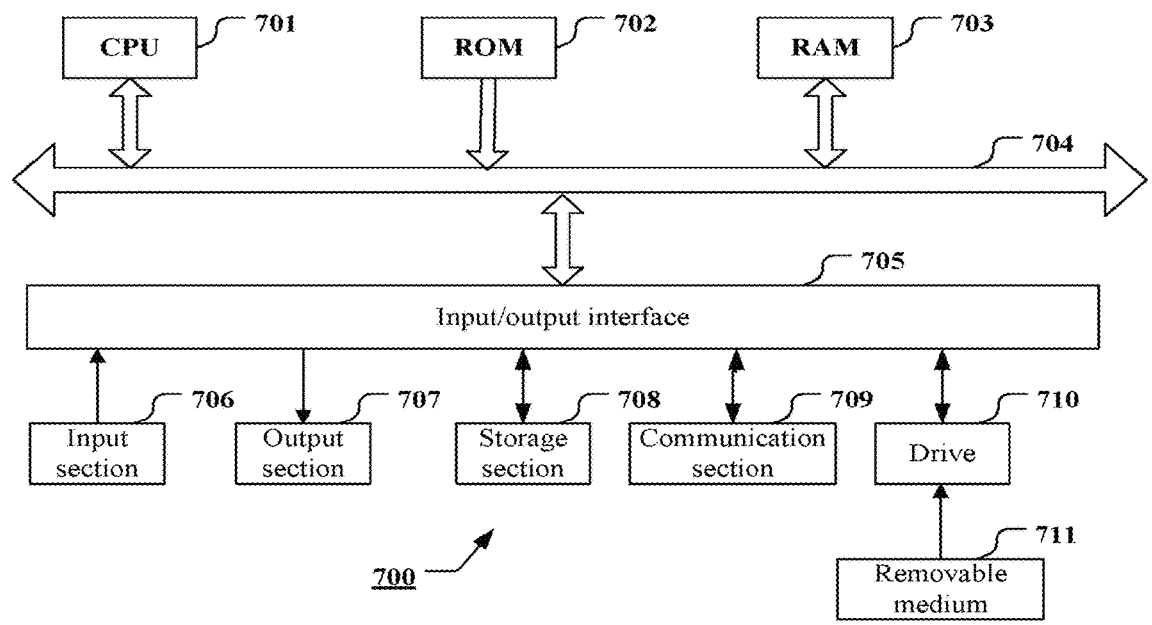
FIG. 7 is a block diagram illustrating an exemplary structure of a computer for implementing the method and the device according to the present disclosure.

In FIG. 7, a computation processing unit (i.e., a CPU) 701 executes various processing according to a program stored in a Read Only Memory (ROM) 702 or a program loaded to a Random Access Memory (RAM) 703 from a storage section 708. In the RAM 703, data required for the CPU 701 in executing various processing and the like is also stored as necessary. The CPU 701, the ROM 702 and the RAM 703 are linked to each other via a bus 704. An input/output interface 705 is also linked to the bus 704.

The following components are linked to the input/output interface 705: an input section 706 including a keyboard, a mouse and the like, an output section 707 including a display such as a Cathode Ray Tube (CRT) and a Liquid Crystal Display (LCD), a speaker and the like, the storage section 708 such as a hard disk and the like, and a communication section 709 such as a network interface card like a LAN card, a modem and the like. The communication section 709 performs communication processing via a network such as the Internet. If necessary, a drive 710 can also be linked to the input/output interface 705. A removable medium 711 such as a magnetic disk, an optical disk, a magneto-optical disk, a semiconductor memory and the like is mounted on the drive 710 as required such that a computer program read out therefrom is installed in the storage section 708 as required.

In a case where the series of processing above is implemented in software, a program constituting the software is installed from the network such as the Internet or the storage medium such as the removable medium 711.

It should be understood by those skilled in the art that the storage medium is not limited to the removable medium 711 shown in FIG. 7 in which the program is stored and which is distributed separately from the device so as to provide the program to the user. Examples of the removable medium 711 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 702, the hard disk contained in the storage section 708 or the like in which the program is stored, and is distributed to the user together with the device containing the storage medium.

Embodiments of the present disclosure also relates to a program product on which machine-readable instruction codes are stored. The instruction codes can perform the method according to the above embodiments of the present disclosure when read and executed by a machine.

Accordingly, the present disclosure also includes storage medium carrying the program product on which the machine-readable instruction codes are stored. The storage media includes a soft-disk, an optical disk, a magnetic disk, a storage card, a storage stick and the like, but is not limited thereto.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the invention is disclosed by describing specific embodiments of the present disclosure, it should be noted that each of the above examples and embodiments is not for limiting but for illustrating. Those skilled in the art may design various modifications, improvements and equivalents of the present disclosure within the spirit and scope of the appended claims. The modifications, improvements and equivalents should also be construed as being included in the scope of the present disclosure.

The invention claimed is:

1. An information processing device, comprising:
processing circuitry configured to:
acquire a depth image and information on an imaging characteristic of an image acquisition apparatus that captured the depth image;
determine, based on the information, an optimization model for processing the depth image; and
process the depth image based on the optimization model,
wherein the optimization model includes a quadratic term that has a fidelity term in a form of:

$$D_i(U) = \sum_{p \in \Omega_i} \eta_i(p)(U(p) - Z_i(p))^2,$$

wherein $D_i(U)$ represents the fidelity term, U represents an optimized depth image, i is an index of the fidelity term, p represents a target pixel, $Z_i$ represents a measured depth image, $\Omega_i$ represents a set of available pixels in the measured depth image, and $\eta_i(p) \geq 0$ is a weight for the target pixel, and wherein the information comprises information related to a quantization step of the image acquisition apparatus, and the determination comprises:

determining a weight of the fidelity term based on the information related to the quantization step, such that the greater the quantization step, the smaller the weight $\eta_i(p)$.

2. The information processing device according to claim 1, wherein the optimization model includes one or more quadratic terms, and processing the depth image based on the optimization model comprises:

converting the quadratic term(s) into a linear system;
deriving a filter by solving the linear system; and
applying the filter to the depth image.

3. The information processing device according to claim 2, wherein solving the linear system comprises solving the linear system using a Jacobi iterative method to derive the filter.

4. The information processing device according to claim 2, wherein the optimization model further comprises a regularization term other than the quadratic term(s), and wherein processing the depth image based on the optimization model comprises: solving the regularization term and the quadratic term(s) respectively, and fusing and iteratively updating the solving result.

5. The information processing device according to claim 1, wherein the quadratic term is in a form of a weighted sum of quadratic functions of depth values, and the determination comprises determining weights of the quadratic functions in the weighted sum according to the information.

6. The information processing device according to claim 5, wherein the optimization model comprises the fidelity term and a regularization term.

7. The information processing device according to claim 5, wherein the quadratic term comprises an energy term in a form of:

$$E_i(U) = \sum_{p \in \Omega_i} \sum_{q \in \Omega_q} \frac{1}{2} \lambda_{pq} (U(p) - U(q))^2,$$

wherein $E_i(U)$ represents the energy term, U represents an optimized depth image, i is an index of the energy term, P represents a target pixel, q represents an available pixel around the target pixel, $\Omega_i$ represents a set of available pixels in a measured depth image, $\Omega_q$ represents a set of available pixels around the target pixel, and $\lambda_{pq} \geq 0$ is a weight for a pair of pixels p and q.

8. The information processing device according to claim 7, wherein the information comprises information related to a noise level of the image acquisition apparatus, and wherein the optimization model is determined such that the greater the similarity between the pair of pixels p and q, the greater the weight $\lambda_{pq}$, and the greater the noise level, the more effective terms being involved in the weighted sum of the quadratic term.

9. The information processing device according to claim 1, wherein the information comprises at least one of:

information related to a noise level of the image acquisition apparatus; and
information related to a noise type of the image acquisition apparatus.

10. The information processing device according to claim 9, wherein the noise level varies with depth and/or spatial position.

11. The information processing device according to claim 9, wherein the image acquisition apparatus comprises two camera units, and the information related to the quantization step comprises:

a baseline distance between the camera units;
a focal length of the camera units; and
a bit number of disparity of the camera units.

12. The information processing device according to claim 11, wherein the quantization step is determined as:

$$q_s(z) = \frac{c(z+f)^2}{Bf},$$

wherein z represents a depth, $q_s(z)$ represents the quantization step, c represents a bit number of disparity, f represents the focal length, and B represents the baseline distance.

13. The information processing device according to claim 9, wherein the information related to the noise level comprises a reference noise level at a reference depth or a reference position, and wherein the acquisition of the information comprises: estimating a noise level at a target depth or a target position by an interpolation based on the reference noise level.

14. The information processing device according to claim 1, wherein the processing circuitry is further configured to acquire polarization information corresponding to the depth image, and the optimization model further comprises a term related to the polarization information.

15. The information processing device according to claim 1, wherein the image acquisition apparatus is configured to capture a depth image of a subject as an object of the processing based on the optimization model.

16. The information processing device according to claim 15, wherein the image acquisition apparatus is further configured to capture an intensity image and/or a polarization image.

17. The information processing device according to claim 16, wherein the processing circuitry is further configured to recognize a facial expression, an action or a gesture based on the processed depth image.

18. The information processing device according to claim 17, wherein the processing circuitry is further configured to generate a corresponding operation instruction based on the recognized facial expression, action or gesture.

19. The information processing device according to claim 1, wherein the processing circuitry is further configured to:

perform a 3D reconstruction process of an object based on the processed depth image, wherein the 3D reconstruction process comprises depth fusion and/or texture mapping.

20. The information processing device according to claim 1, wherein the imaging characteristic is a measured imaging characteristic.

21. An information processing method, comprising:

acquiring a depth image and information on an imaging characteristic of an image acquisition apparatus that captured the depth image;
determining, based on the information, an optimization model for processing the depth image; and processing the depth image based on the optimization model, wherein the optimization model includes a quadratic term that has a fidelity term in a form of:

$$D_i(U) = \sum_{p \in \Omega_i} \eta_i(p)(U(p) - Z_i(p))^2,$$

wherein $D_i(U)$ represents the fidelity term, U represents an optimized depth image, i is an index of the fidelity term, p represents a target pixel, $Z_i$ represents a measured depth image, $\Omega_i$ represents a set of available pixels in the measured depth image, and $\eta_i(p) \geq 0$ is a weight for the target pixel, and wherein the information comprises information related to a quantization step of the image acquisition apparatus, and the determination comprises:

determining a weight of the fidelity term based on the information related to the quantization step, such that the greater the quantization step, the smaller the weight $\eta_i(p)$.

\* \* \* \* \*